United States Patent [19]

Ishikawa et al.

[11] 4,321,590
[45] Mar. 23, 1982

[54] CHECK MECHANISM FOR FLUID LEVEL WARNING DEVICE IN FLUID RESERVOIRS

[75] Inventors: Masakazu Ishikawa; Harumi Ohori; Takashi Kiriyama, all of Toyota, Japan

[73] Assignee: Toyota Jidosha Kogyo Kabushiki Kaisha, Aichi, Japan

[21] Appl. No.: 175,590

[22] Filed: Aug. 5, 1980

[30] Foreign Application Priority Data

Aug. 8, 1979 [JP] Japan ............................ 54/109092[U]

[51] Int. Cl.³ .............................................. G08B 29/00
[52] U.S. Cl. ...................................... 340/515; 340/624
[58] Field of Search ................. 340/624, 625, 514, 515

[56] References Cited
U.S. PATENT DOCUMENTS 3,781,858 12/1973 Lewis .................................. 340/515

Primary Examiner—John W. Caldwell, Sr.
Assistant Examiner—Daniel Myer
Attorney, Agent, or Firm—Armstrong, Nikaido, Marmelstein & Kubovcik

[57] ABSTRACT

In combination with a fluid reservoir in which a magnetically operable switch is assembled to be closed by magnetic force of a permanent magnet on a float such that a warning signal is issued when the float moves down to a lower warning position dependent on a minimum fluid level in the reservoir, a check mechanism includes a spring loaded vertical rod extending into the interior of the reservoir from the exterior and arranged to be engaged at its lower end with the float when the surface of fluid is maintained at a predetermined level. When the vertical rod is pushed downward, the float is forcibly moved down to the lower warning position to check malfunction of the switch.

2 Claims, 3 Drawing Figures

CHECK MECHANISM FOR FLUID LEVEL WARNING DEVICE IN FLUID RESERVOIRS

BACKGROUND OF THE INVENTION

The present invention relates to a fluid reservoir in which a magnetically operable switch is assembled to be closed by magnetic force of a permanent magnet on a float such that a warning signal is issued when the float moves down to a lower warning position dependent on a minimum fluid level in the reservoir, and more particularly to check mechanism in combination with the fluid reservoir for checking malfunction of the assembled switch.

SUMMARY OF THE INVENTION

A primary object of the present invention is to provide a check mechanism for a fluid reservoir capable of checking malfunction of a magnetically operable switch assembled within the reservoir without any difficulty in its manipulation and preventing entrance of water or other contaminants into the reservoir.

Another object of the present invention is to provide a check mechanism for a fluid reservoir in which the component parts of the check mechanism are assembled within the reservoir without undesired influence to the assembeld switch under the normal condition.

According to an aspect of the present invention, the above-mentioned objects are accomplished by provision of a check mechanism which comprises a vertical rod extending into the interior of a reservoir casing from the exterior through a seal cap of the reservoir and being movable along one side of a tubular member extending downward from the seal cap into the fluid in the reservoir, the vertical rod having a stopper in engagement with a portion of the seal cap exposed in the reservoir casing and a lower end engageable with the upper face of a float to push down the float when the surface of fluid is maintained at a predetermined level, and a spring for biasing the vertical rod upward to maintain engagement of the stopper against the exposed portion of the seal cap, whereby when the vertical rod is pushed downward against biasing force of the spring, the float is forcibly moved down to a lower warning position dependent on a minimun fluid level in the reservoir casing to check malfunction of a magnetically operable switch assembled within the tubular member.

BRIEF DESCRIPTION OF THE DRAWING

Additional objects and advantages of the present invention will be more readily apparent from the following detailed description of preferred embodiments thereof when taken together with the accompanying drawing in which.

DESCRIPTION OF THE PREFERRED EMBODIMENTS

Figure 1:
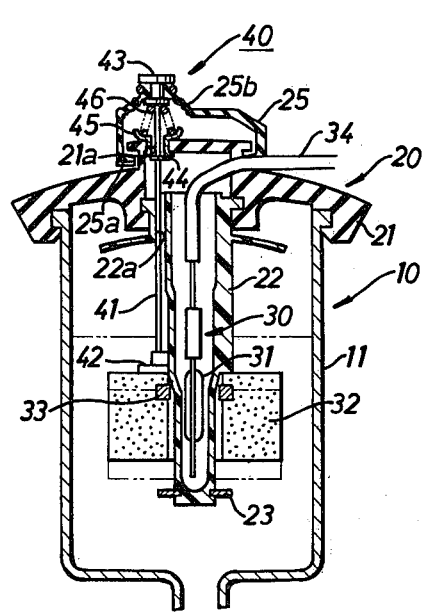
FIG. 1 is a sectional view of a fluid reservoir equipped with a check mechanism in accordance with the present invention.

Referring now to the drawing, particularly in FIG. 1, a sealed fluid reservoir assembly 10 includes a reservoir casing 11 which is adapted for mounting on a brake master cylinder (not shown) to store brake fluid therein as a supply for the master cylinder. A cap assembly 20 includes a main cap 21 made of oil-resistant synthetic rubber which is coupled in an air tight manner with the upper opening of casing 11 to close the interior of casing 11. The main cap 21 is intgrally provided at the inner wall thereof with a central tubular member 22 which extends downward through a float 32 and is provided therein with a normaly open reed switch 31. The tubular member 22 is made of oil-resistant synthetic resin and has a closed bottom to which an annular stopper 23 is secured to receive the float 32 thereon.

The float 32 is integrally provided at its inner periphery with a ring shaped permanent magnet 33 which is cooperable with the reed switch 31 to constitute a magnetically operable switch means 30. The reed switch 31 is connected through a resistor to an alarm lamp or buzzer (not shown) by way of a lead wire 34 to issue a warning signal should a dangerous decrease in the quantity of the brake fluid occur. The tubular member 22 is provided at its neck with a dome shaped circular collar and at its lower portion with a stepped stopper to restrict upward movement of the float 32 such that the float 32 is moved up and down at a lower region of the tubular member 22 in accordance with variations of the level of brake fluid. The tubular member 22 is further provided at one side thereof with a vertical through hole 22a, and the main cap 21 is formed at its head with a through hole 21a aligned with hole 22a.

Figure 2:
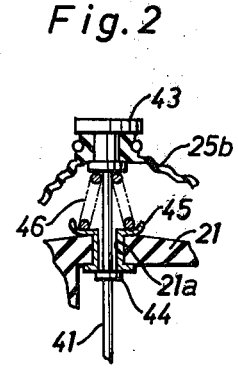
FIG. 2 is an enlarged sectional view showing a portion of FIG. 1.

For checking malfunction of the switch means 30, a check mechanism 40 comprises a vertical rod 41 which is inserted into the interior of casing 11 through holes 21a and 22a along tubular member 22 such that the vertical rod 41 is manually moved up and down from the exterior. The vertical rod 41 is integrally provided at its lower end with a shoe 42 which is engageable against the upper face of float 32. The vertical rod 41 is further provided at its upper end with an operation knob 43 and at its interim portion with a stopper 44 which abuts against a seat member 45 fixed within hole 21a of main cap 21, as can be well seen in FIG. 2. A compression coil spring 46 is interposed between the knob 43 and the seat member 45 to resiliently bias the vertical rod 41 upward thereby to maintain engagement of the stopper 44 against the bottom of seat member 45. Thus, the vertical rod 41 acts to prevent the float 32 from bouncing in the stored brake fluid. When the vertical rod 41 is manually pushed downward, the float 32 is forcibly moved down to check malfunction of the switch means 30. In addition, a sub-cap 25 of synthetic rubber is loosely coupled with the head of main cap 21 to contain the coil spring 46 therein. The sub-cap 25 is formed at its bottom periphery with a radial recess 25a providing a vent passage around the head of cap 21 and at its head with an extendable bellows 25b to which the knob 43 is secured in an air tight manner.

In use of the sealed fluid reservoir assembly 10 having the above-mentioned construction, when the surface of brake fluid is maintained at a predetermined level, the vertical rod 41 is engaged at its interim stopper 44 against the bottom of seat member 45 due to upward biasing force of the coil spring 46 so that the vertical rod 41 does not move in spite of vibration or impact exerted on the vehicle. Under this condition, the float 32 is resiliently engaged at its upper face against the shoe 42 of rod 41 due to buoyancy, and the reed switch 31 does not close to remain the alarm lamp or buzzer inoperative. When the level of brake fluid drops below a minimum fluid level due to leakage of the brake fluid, the float 32 separates downward from the shoe 42 of rod 41, and the reed switch 31 is then closed due to magnetic force of the permanent magnet 33 to activate the alarm lamp or buzzer so as to alert the operator to the shortage of brake fluid.

Figure 3:
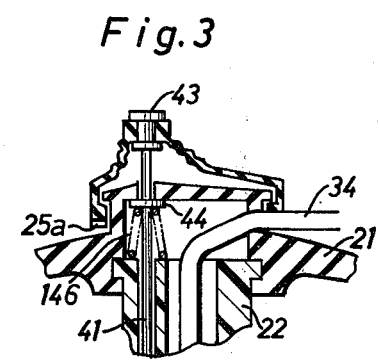
FIG. 3 is an enlarged sectional view showing a modification of the check mechanism of FIG. 1.

For checking malfunction of the switch means 30, the vertical rod 41 is manually pushed downward against the biasing force of spring 46 when the surface of brake fluid is maintained at the predetermined level. Then, the float 32 is forcibly moved down below the minimum fluid level to close the reed switch 31. On such an occasion, the inspection of switch means 30 is reliably accomplished only by pushing the vertical rod 41 without removal of the main cap 21. This serves to prevent entrance of water or contaminants into the brake fluid from the exterior. In the actual practice of the present invention, the coil spring 46 may be replaced with such a compression coil spring 146 as shown in FIG. 3. The coil spring 146 is interposed between the upper end of tubular member 22 and the stopper 44 of vertical rod 41 to maintain engagement of the stopper 44 with the inner wall of the head of main cap 21.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is

1. In combination with a fluid reservoir which comprises a casing for storing an amount of fluid; a seal cap coupled with an upper opening of said casing to close the interior of said casing and including a tubular member secured at its upper end to the inner wall of said seal cap and extending downward into the fluid in said casing; a float positioned in said casing for movement in a vertical direction in response to variations in the level of fluid in said casing; and switch means including a permanent magnet secured to said float and a magnetically operable switch mounted within said tubular member such that said switch is closed by the magnetic force of said magnet when said float is at a predetermined position, whereby a warning signal is issued when said float moves down to a lower warning position dependent on a minimun fluid level in said casing; and a check mechanism comprising a vertical rod extending into the interior of said casing from the exterior thereof through a head portion of said seal cap and being movable along one side of said tubular member, said vertical rod having a stopper in engagement with a portion of said seal cap and said tubular member and said vertical rod having a lower end engageable with the upper face of said float to push down said float when the surface of fluid is maintained above said predetermined level; and resilient means for biasing said vertical rod upward to maintain engagement of said stopper against said seal cap;

the improvement which comprises a second cap coupled over the head of said seal cap and formed at its bottom periphery with a radial recess providing a vent passage around the head portion of said seal cap, said second cap being formed at its head portion with a flexible means, the upper end portion of said vertical rod being secured thereto in an air tight manner.

2. A check mechanism in combination with a fluid reservoir as claimed in claim 1, wherein said vertical rod includes an operation knob at the exteriorly extending upper end thereof, for pushing said rod downward, and said rod including at the lower end thereof, a shoe engageable with the upper face of said float.

* * * * *